United States Patent
Ostand

[19]

[11] Patent Number: 5,836,348
[45] Date of Patent: Nov. 17, 1998

[54] PILOT CONTROLLED BLANKETING VALVE

[75] Inventor: Paul R. Ostand, Sissonville, W. Va.

[73] Assignee: Appalachian Controls Environmental, South Charleston, W. Va.

[21] Appl. No.: 580,333

[22] Filed: Dec. 28, 1995

[51] Int. Cl.⁶ .............................. F16K 17/10; F16K 37/00
[52] U.S. Cl. ........................ 137/489; 137/209; 137/557
[58] Field of Search .................................... 137/102, 209, 137/489, 557

[56] References Cited

U.S. PATENT DOCUMENTS

| | | |
|---|---|---|
| 843,174 | 2/1907 | Reynolds . |
| 1,982,045 | 11/1934 | Clithero et al. . |
| 2,707,970 | 5/1955 | Hughes . |
| 3,132,659 | 5/1964 | Kenyon . |
| 3,137,215 | 6/1964 | Taplin . |
| 3,283,772 | 11/1966 | Ensign .................................... 137/107 |
| 3,373,236 | 3/1968 | Taplin . |
| 3,414,008 | 12/1968 | Greenwood . |
| 3,477,456 | 11/1969 | Powell . |
| 3,592,224 | 7/1971 | Bois . |
| 3,837,358 | 9/1974 | Zieg et al. .......................... 137/218 X |
| 3,858,598 | 1/1975 | Carman et al. . |
| 4,245,663 | 1/1981 | Solowy . |
| 4,274,440 | 6/1981 | Richard, Jr. . |
| 4,312,375 | 1/1982 | Leinemann . |
| 4,402,341 | 9/1983 | Reip . |
| 4,425,938 | 1/1984 | Papa et al. . |
| 4,991,620 | 2/1991 | Ligh . |
| 5,067,522 | 11/1991 | Ligh . |
| 5,072,749 | 12/1991 | Ligh . |
| 5,094,267 | 3/1992 | Ligh . |
| 5,131,424 | 7/1992 | Heidorf et al. . |
| 5,443,090 | 8/1995 | Ligh . |
| 5,474,351 | 12/1995 | Ligh . |
| 5,511,581 | 4/1996 | Ligh . |
| 5,660,204 | 8/1997 | Piotrowski et al. . |

OTHER PUBLICATIONS

Vacu–Gard® Tank Blanketing Valves, 1993 Brochure.
Groth Tank Protection Products "Groth Model 3000 Series Blanket Gas Regulator" Brochure (Undated).
Anderson, Greenwood & Co., Making Technology Perform "AGCO® Tank Blanketing Regulator System" Dec. 1989.
Shand & Jurs Tank Fittings & Gauging, "Model 94270 Tank Blanketing Valve" Instruction Manual (Undated).
Series No. 20, Tank Blanketing . . . A Versatile Tool for Fire & Explosion Prevention, Brochure (Undated).
Bellofram, "The Rolling Diaphragm" 1992 Design Manual Intech, Feb. 1994, p. 10.

*Primary Examiner*—Gerald A. Michalsky
*Attorney, Agent, or Firm*—Jacobson, Price, Holman & Stern, PLLC

[57] ABSTRACT

The blanketing valve has a diagnostic port to aid in analyzing the valve's operation. A pressure gauge is connectable or permanently connected to the diagnostic port. The diagnostic port measures the pressure above a main valve in a passageway connecting a pilot inlet chamber and a main valve piston chamber. This pressure controls the main valve and is an indicator of pilot valve action. Comparing this pressure to inlet pressure indicates pilot response and is a valuable aid in determining what problems may exist.

6 Claims, 5 Drawing Sheets

PILOT CONTROLLED BLANKETING VALVE

FIELD OF THE INVENTION

The present invention relates to the use of a pilot controlled blanketing valve having a diagnostic port for measuring the operating condition of the valve, and including a rolling diaphragm pilot valve.

BACKGROUND OF THE INVENTION

Tank blanketing is an effective way to prevent fires in storage tanks which contain flammable liquids. Tank blanketing prevents the formation of an explosive vapor/air mixture. A blanket or pad of inert gas in a vapor space inside a tank prevents atmospheric air from entering the tank. In addition to preventing outside air, which contains oxygen, moisture and other contaminants from entering the tank, the blanket also minimizes evaporation of the stored product to reduce product emission levels.

The inert gas, usually Nitrogen, is injected as necessary, into the vapor space in the tank to maintain an inert atmosphere. The blanket pressure is usually very low (less than 1 PSI).

The inert gas is admitted only during inbreathing cycles (vacuum cycles). An inbreathing cycle occurs when liquid is being withdrawn from a tank, or when vapors condense in a tank due to a decrease in temperature. The amount of inert gas required for a specific application is based on the maximum inbreathing demand under conditions of sudden cooling, caused by weather conditions, and the emptying rate of the tank.

Although Nitrogen is most commonly used, other gases, including natural gas, may be used in some applications. Depending upon the specific application, the selection of an inert gas for a particular process is based upon at least one of the following characteristics:

1. Non-flammable in the desired atmosphere
2. Non-interacting with the tank liquid
3. Chemically inactive
4. Non-toxic
5. Availability in large quantities
6. Economic factors In designing a tank blanketing system, several considerations are evaluated:

1. The tanks themselves as well as the piping, dikes, fittings, etc., should be designed and constructed in accordance with sound engineering principles.
2. Inert gas or tank blanketing equipment must be completely reliable and capable of maintaining an adequate supply of inert gas at all times. Equipment breakdown or equipment that is inadequately sized for the job will result in a higher oxygen concentration in the vapor space of the storage tank which would mix with the vapors resulting in a potentially flammable mixture.
3. The inert gas should be introduced into the tank so that it is distributed effectively.
4. Contamination of the inert gas from any source must be guarded against. Suitable devices should be employed to hold moisture to an absolute minimum.

A blanketing valve is used in tank blanketing applications to regulate the pressure of the inert gas layer on top of a tank liquid. The valve senses the pressure of the tank blanket and opens to allow flow in of more inert gas when pressure drops below a set pressure. The valve closes and stops flow when pressure builds back up to the set pressure in the tank.

SUMMARY OF THE INVENTION

In the pilot controlled blanketing valve according to the present invention, tank pressure is sensed on the underside of a diaphragm of an actuator. The diaphragm directly actuates a pilot valve. Flow of gas through the pilot valve is directed to the tank being blanketed. Gas flowing through the pilot valve causes the pressure to drop in a sealed chamber above a main valve piston also included in the blanketing valve according to the present invention.

When the pressure has dropped sufficiently, the main valve opens to a throttling position and allows blanketing gas to flow into the tank in combination with gas flow through the pilot valve. When the pressure is restored in the tank, the diaphragm actuator allows the pilot to close. Pilot flow ceases and restores the pressure above the main valve piston to full inlet pressure, shutting off the main valve.

Blanketing gas is directed to the main valve inlet and to the externally mounted pilot filter. The main valve and pilot valve are both normally closed. There is no gas flow through these valves if the tank pressure is at or above setpoint.

The main valve is primarily a piston that has a diameter larger than the diameter of the gas inlet orifice. This piston is in a sealed chamber that is at inlet gas pressure when the tank pressure is at or above setpoint. Since the area of the piston is larger than the inlet orifice area, the net effect is that the main valve is tightly sealed by inlet pressure.

The upper side of the diaphragm actuator is spring loaded by a range spring. The range spring is adjusted to obtain the desired tank pressure. The downward force of the range spring on the upperside of the diaphragm is opposing the force of the pressure from the tank on the underside of the same diaphragm. When the tank pressure is at or above setpoint, the diaphragm is urged upward, against the spring. If the tank pressure should fall below the setpoint, the spring moves the diaphragm down. This downward motion opens the pilot valve.

The pilot valve is actuated by the diaphragm actuator engaging a poppet of the pilot valve which is normally closed against the pilot valve seat. Inlet gas is supplied to the pilot valve through an orifice located in a bonnet. A rolling diaphragm in the pilot valve fully balances the pressure forces across the pilot poppet. The inlet pressure to the pilot acts against the underside of the poppet and the upper side of the rolling diaphragm.

Full balancing of forces is essential if the pilot valve is not to be unduly influenced by changes in inlet pressure. Regardless of the inlet pressure, the pressure forces across the pilot valve are in balance. A bias spring in the pilot urges the pilot upward to allow the pilot poppet to move up with the diaphragm. It also provides a seating force to shut-off pilot flow.

When the tank conditions are such that the tank pressure is at or above the desired pressure (set-point) there will be no gas flow through the unit. If the tank pressure falls just slightly below the setpoint, the pilot valve will open and try to maintain the tank pressure. Should the tank pressure fall further, the pilot will open further in an attempt to satisfy the tank demand. Finally, the pilot will cause the main valve to open and satisfy the tank demand.

The main valve is controlled by the pilot in the following manner. As gas passes through the external pilot filter, it flows through the pilot inlet orifice to the pilot inlet chamber. As the gas flows through the orifice, its pressure drops. The greater the flow through the pilot inlet orifice, the further the pressure drops. The pressure in the pilot inlet chamber is transmitted through an internal passage to a sealed piston chamber above the main valve. Since this main valve chamber is of larger area than the main valve inlet orifice, the main valve will act to close and shut off the main valve inlet orifice as long as inlet pressure forces the main valve tightly into the main valve orifice.

As the pressure drops in the pilot inlet chamber, it also drops in the main valve piston chamber. When it drops sufficiently, the down-force created by this pressure on the larger piston area becomes less than the up force created by the inlet pressure acting on the main valve seat at the main valve orifice. Accordingly, the main valve opens and allows flow from the valve inlet to the tank.

Should problems arise and field service is required, the blanketing valve has a diagnostic port to aid in analyzing the valve's operation. A pressure gauge is connectable or permanently connected to the diagnostic port. The diagnostic port measures the pressure above the main valve in the passageway connecting the pilot inlet chamber and the main valve piston chamber. This pressure controls the main valve and is an indicator of pilot valve action. Comparing this pressure to inlet pressure indicates pilot response and is a valuable aid in determining what problems may exist.

The valve unit according to the present invention can be operated with inlets from 25 to 200 psig and control pressures from 0.5 inches w.c. to 1.5 psig. The fully balanced pilot valve allows for operation with a varying inlet pressure. The oversized actuator offers a high sensitivity to changes in tank pressure, increasing accuracy.

The main valve trim is characterized, linear being standard. Characterized trim allows for better control, resulting in less chance of over or undershooting the set point in response to system changes.

The main valve is normally closed. A bias spring located in the main valve piston chamber, in addition to inlet pressure, maintains the main valve in a closed position. Tight shut-off is further assured by a soft seated main valve.

The pilot valve is fully balanced under all operating conditions. The rolling diaphragm is utilized to balance the pilot gas pressures on the pilot valve seat. The rolling diaphragm exhibits a constant area and extremely low hysteresis, enabling the rolling diaphragm to balance the forces across the pilot valve under all conditions. A total operating band of less than 0.5 inches w.c. is common. Lock-up is typically less than 0.2 inches w.c.

The pilot valve stroke is minimal to further insure accuracy and fast response. During movement of the pilot valve, the rolling diaphragm changes its amount of contact between a sidewall of the pilot inlet chamber and the outer sidewall of a piston housing the bias spring of the pivot valve.

By the present invention, a system is provided for periodic checking of a gas blanketing system. The system must be checked to make sure it is performing to specification because the systems are usually in locations that subject them to outdoor weather. The system must be able to operate for long periods at tight shut-off while remaining sensitive to small pressure changes. The system must be able to react and supply large volumes of gas quickly as product transfers occur or the temperature drops suddenly due to changing weather conditions.

To satisfy the requirement for accurate testing of the accuracy of a tank blanketing valve, the blanketing valve according to the present invention includes a diagnostic port. The diagnostics feature relies on the relationship of the pressure in the pilot and main valve chambers to aid in analyzing the operation of the valve. To use the pressure measured at the diagnostic port to obtain an indication of the accuracy of the system, certain parameters are required. In order to evaluate the diagnostic port pressure ($P_c$) the known parameters of $A_c$=chamber area above the main valve, $A_i$=inlet area below the main valve, and $F_s$=spring preload, and the $P_i$=inlet pressure, as obtained from observing an inlet pressure gauge are used, where $A_c > A_i$ and $P_c \leq P_i$ are maintained. When $P_c = P_i$ at the diagnostic port gauge, the pilot valve and the main valve should be closed, indicative that the tank pressure is at or above the set point. There should be no gas flow.

If the blanketing valve is operating correctly, the main valve should start to open when $$P_i \cdot A_i - P_c \cdot A_c - F_s = O$$

$$P_c = \frac{(P_i \cdot A_i) - F_s}{A_c}$$

When the main valve is fully opened, and the pilot valve is also open to both supply gas to the tank, then $$P_i \cdot A_i - P_c \cdot A_c - F_s - R \cdot L = O$$

$$P_c = \frac{(P_i \cdot A_i) - (R \cdot L) - F_s}{A_c}$$

where R=spring rate and L=valve lift.

In the first condition, just before the main valve starts to open, the forces are balanced and the main valve is touching the seat, but all down forces on the seat are removed. Motion and flow are incipient. That is, the inlet pressure acting on inlet area, $A_i$, is balancing the two downward forces, the chamber pressure acting on larger area $A_c$ and the spring preload, $F_s$. Any further reduction in $P_c$ will cause the main valve to lift off its seat. Conversely, any increase in $P_c$ will cause the main valve to seat.

In the second condition, the main valve is fully open, the main valve has lifted its full stroke. Flow is at a maximum. Now inlet pressure acting on inlet area, $A_i$, is balancing the three downward forces, the chamber pressure acting on larger area, $A_c$, the spring preload, $F_s$, and the additional spring load represented by R×L. Any further reduction in $P_c$ will have no effect as the main valve is at full lift and has reached a mechanical stop. Conversely, any increase in $P_c$ will cause the main valve to move toward the seat, throttling flow.

Accordingly, it is an object of the present invention to provide a pilot controlled blanketing valve having a diagnostic port communicating with a gas flow passage connecting gas chambers of a pilot valve and a main valve.

It is another object of the present invention to provide a pilot controlled blanketing valve having a diagnostic port communicating with a gas flow passage connecting gas chambers of a pilot valve and a main valve with the diagnostic port providing measurements indicative of the functioning of the blanketing valve.

It is yet another object of the present invention to provide a pilot controlled blanketing valve having a diagnostic port communicating with a gas flow passage connecting gas chambers of a pilot valve and a main valve with the diagnostic port providing measurements indicative of the functioning of the blanketing valve with the measurements taken at the diagnostic port demonstrating an equilibrium condition, an opening of the pilot valve or both the main and pilot valves being in a fully opened condition.

It is still yet another object of the present invention to provide a pilot controlled blanketing valve having a rolling diaphragm located in a pilot valve chamber for improved functioning of the pilot valve between a closed and an open position.

It is still yet another object of the present invention to provide a pilot controlled blanketing valve having a rolling diaphragm in a pilot valve chamber with a diagnostic port connected to a gas flow passage communicating between the pilot valve and a main valve.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
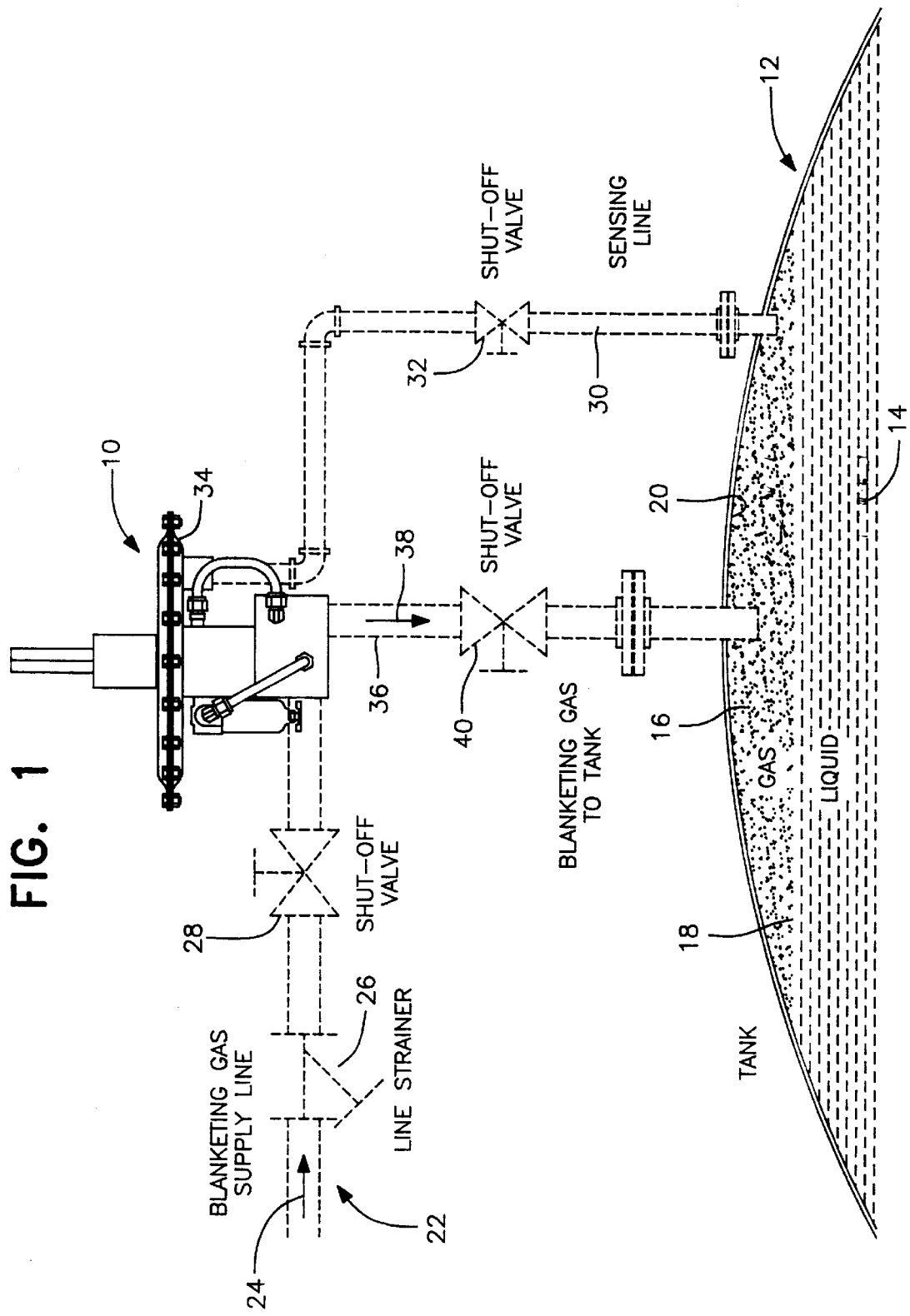
FIG. 1 is a schematic diagram of a pilot controlled blanketing valve installed on a tank.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
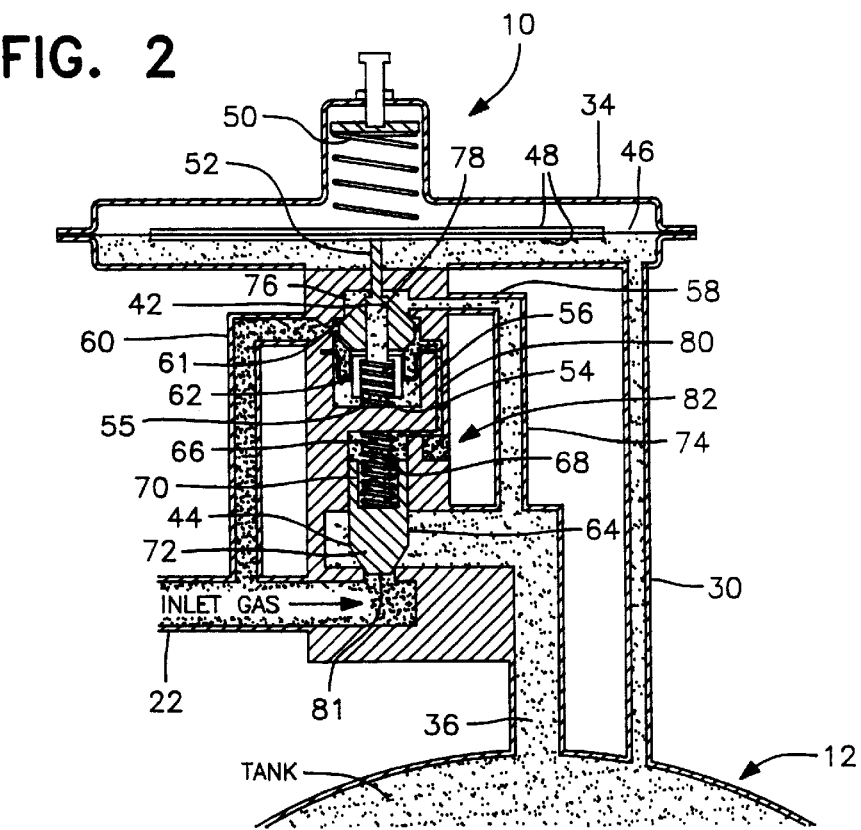
FIG. 2 is a schematic sectional view of a pilot controlled blanketing valve according to the principles of the present invention where the main valve and pilot valve are both closed.
Figure 3:
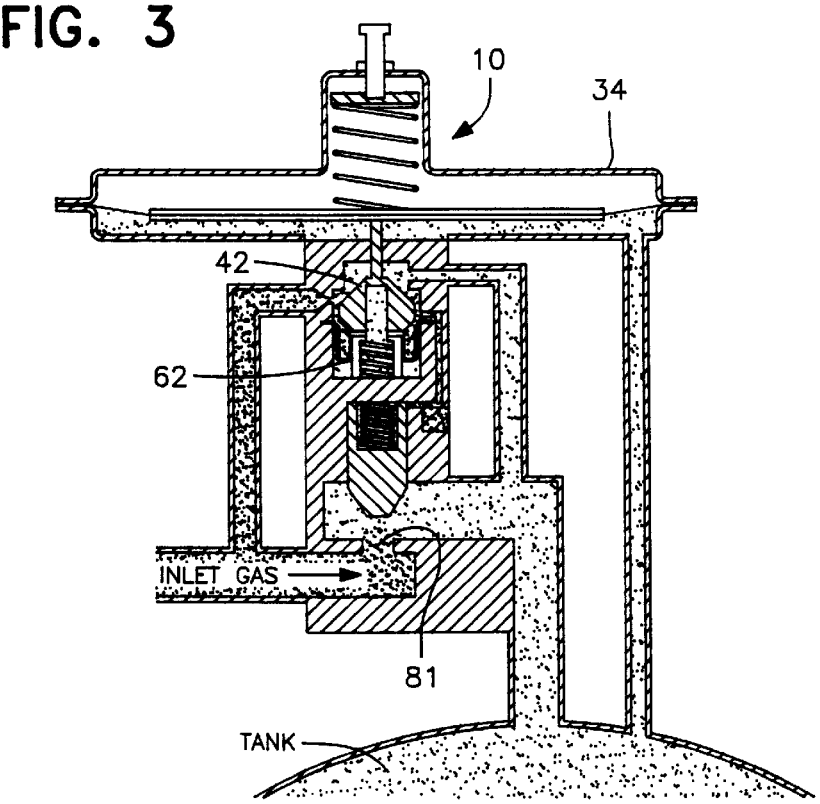
FIG. 3 is a schematic sectional view of a pilot controlled blanketing valve according to the principles of the present invention illustrating an open position of the pilot valve and an open position of the main valve.

With reference to the drawings, in general, and to FIGS. 1 through 3, in particular, a pilot controlled blanketing valve embodying the teachings of the subject invention is generally designated as 10. With reference to its orientation in FIG. 1, the blanketing valve 10 is used in conjunction with a tank 12 containing a liquid 14 having an inert gas 16 filling the space between the uppermost surface 18 of the liquid and the top of the tank 20.

The blanketing or inert gas supply line 22, which provides blanketing gas in the direction of arrow 24, supplies, upon demand, gas through a line strainer 26. A shut-off valve 28 in the supply line 22 can be used to terminate flow of gas to the blanketing valve 10.

The pressure of the gas 16 at the top of the tank 12 is sensed through a sensing line 30 having an in line shut off valve 32. The sensing line is connected to the underside of an actuator 34 of the blanketing valve. A pilot valve and a main valve, located within the blanketing valve 10, control gas flow dependent upon the sensed pressure of the gas 16 in the tank 12. Under certain conditions, gas is allowed to flow when the pilot valve by itself or in combination with the main valve are opened to release gas from supply line 22 into blanketing gas line 36 so that the gas is directed in the direction of arrow 38, through shut-off valve 40, and into tank 12.

At set point conditions, both the pilot valve and main valve remain closed. Under decreased gas pressure conditions, first the pilot valve is moved to an open position and dependent upon the sensed gas pressure, the main valve may also be opened, in combination with the opened pilot valve. These conditions are schematically shown and will be described with reference to FIGS. 2 and 3.

To control the movement of pilot valve 42 and main valve 44, the blanketing gas in the upper part of tank 12 fills sensing line 30 and extends through sensing line 30 to the underside of actuator 34. Actuator 34 includes a diaphragm 46 having centrally located diaphragm plates 48 located on opposite sides of the diaphragm. The diaphragm plates are biased by the force of range spring 50 in a downward direction for engagement with pilot valve poppet 52. Countering the downward bias on poppet 52 is an opposing biased spring 54 located in an opening of pilot piston 55 located in a chamber 56 of the pilot valve 42. On an opposite side of chamber 56 is pilot inlet chamber 58 of the pilot valve which is in communication by gas line 60 and inlet orifice 61 to the supply line 22. Rolling diaphragm 62 separates the chambers 56 and 58 and balances the gas pressure forces on opposite sides of the diaphragm.

Main valve 44, spaced below the pilot valve, includes a piston 64 located in blanketing gas line 36. Blanketing line 36 communicates with the inert gas in the tank 12. On one end 70 of the piston 64 is a piston chamber 66 which includes a spring 68 for biasing the piston downwardly. The opposite end 72 of the piston 64 is seated in main valve inlet orifice 81 of inlet gas line 22. The gas in blanketing gas line 36 surrounding the central portion of piston 64 extends by extension line 74 to communicate with an area 76 located above the pilot valve 42. Continued gas flow is prevented by the seating of the pilot valve. A pilot valve orifice 78 in the pilot valve extends from chamber 76 through the interior of the pilot valve so as to communicate with chamber 56 which includes spring 54.

In addition, passageway 80 communicates between pilot inlet chamber 58 located on top of the rolling diaphragm 62 and piston chamber 66 located on top of the piston 64. In communication with passageway 80 is diagnostic port 82.

In FIG. 2, the pilot valve and main valve are shown in a closed position, indicative of a gas pressure in tank 12 at or above a predetermined set point. The equilibrium of the system is controlled by the bias of range spring 50 acting in combination with the bias of springs 54 and 68 and a desired gas pressure in tank 12.

In the closed position of the pilot and main valves, the inlet gas is shown as being prevented from flowing, as indicated by the darkened shading in FIG. 2. Accordingly, gas flow is contained at main valve orifice 81 and in pilot inlet chamber 58 and piston chamber 66.

As the tank gas pressure decreases due to various reasons, for example, removal of liquid from the tank, the gas pressure falls below a predetermined set point. The gas pressure in the sensing line 30 and therefore below the diaphragm in the actuator 34 will be decreased. Due to the bias of the range spring 50, the diaphragm will be deflected downwardly to a position as shown in FIG. 3, for example. The diaphragm plate 48 then contacts the pilot valve poppet 52 to push the poppet downwardly against the bias of spring 54.

As the pilot valve moves away from its seated contact points in extension passageway 74, inlet gas is allowed to pass through pilot inlet orifice 61 and around pilot valve 42. Gas flows into chamber 76 and through extension 74 and line 36 into tank 12. The downward movement of the pilot valve moves or "rolls" the rolling diaphragm downwardly, dependent upon the amount of underpressure in the tank 12.

The release of inlet gas to the tank 12 around the pilot valve may be sufficient to satisfy the pressure requirements to return the tank to the desired preset pressure. Increased gas pressure in the tank would simultaneously increase gas pressure to the underside of the diaphragm in the actuator 34 so as to force the range spring 50 upwardly, allowing the poppet 52 to move upwardly and seating the pilot valve 42 to prevent further gas flow.

However, as shown in FIG. 3, if further pressure is required in the tank to meet the desired set point pressure, the downward movement of the pilot valve allows inlet gas to flow through the pilot inlet orifice 61. As the gas flows through the orifice the pressure in pilot inlet chamber 58 drops. The greater the extent of gas flow the further the pressure drops. The reduced pressure in the pilot inlet chamber 58 is transmitted through passageway 80 to the sealed piston chamber 66 located above the piston 64 of the main valve.

Since the piston chamber 66 is of a larger area than the main valve inlet orifice 81 the chamber 66 acts to close the main valve by forcing the piston 64 tightly into the orifice 81 as long as the pressure in piston chamber 66 is the same as the inlet gas pressure in line 22. However, as the pressure drops in the pilot inlet chamber 58, the pressure also drops in the main valve piston chamber 66. When the pressure drops sufficiently in the main valve piston chamber 66, the down force created by the pressure created in the main valve piston chamber is less than the up force of gas through the orifice 81. Accordingly, the main valve is opened by upward movement of the piston 64 away from the orifice 81 as shown in FIG. 3 to allow inlet gas into line 36. Gas in line 36 passes to tank 12 until sufficient pressure is built up in tank 12 to force the diaphragm 46 upwardly to close the pilot valve and also the main valve.

Figure 4:
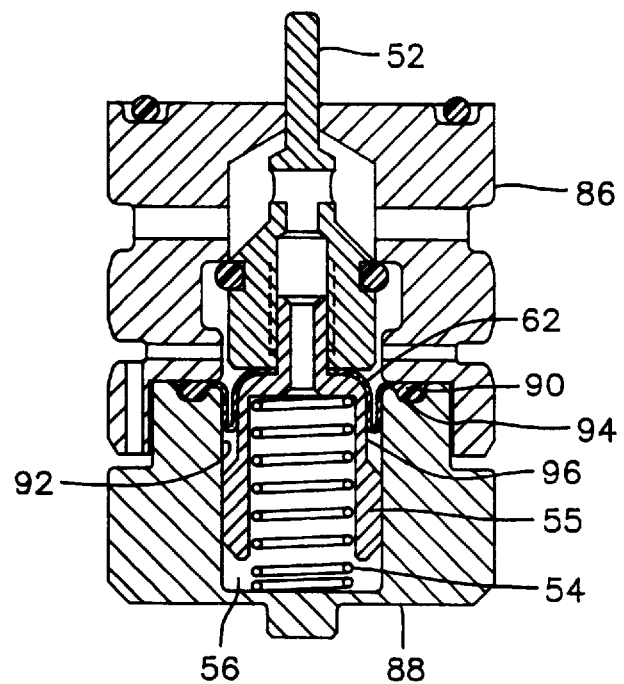
FIG. 4 is an enlarged sectional view of a pilot valve in a closed position.

In FIG. 4, an enlarged view of a pilot valve 42 as shown in FIG. 2, in its closed position, is shown. The pilot valve includes an upper cage portion 86 mounted on top of a lower cage portion 88 with an interposed rolling diaphragm 62 anchored by annular thickened portion 90 located in recessed ring 94 of the lower cage 88. The diaphragm 62 is bent to include vertically extending, parallel portions between an interior wall 92 of chamber 56 and an exterior wall 96 of pilot piston 55.

Figure 5:
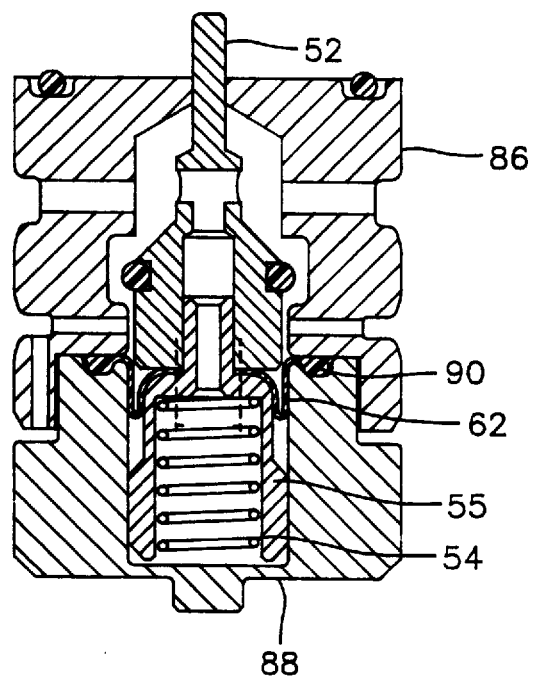
FIG. 5 is an enlarged sectional view of the pilot valve in an open position.

As shown in FIG. 4, where the pilot valve is in a closed position, the vertically oriented portions of the rolling diaphragm in intimate contact with the interior wall 94 of lower cage 88 and in intimate contact with the exterior wall 96 of pilot piston 55, are approximately equal in length. As the pilot valve is opened by downward movement of the pilot poppet 52, as shown in FIG. 5, the piston 55 is also moved downwardly with the result that the vertically extending portion of the rolling diaphragm in intimate contact with the interior wall 92 of the lower cage 88 is of a greater height than the vertically oriented portion of the rolling diaphragm in intimate contact with the exterior wall 96 of the pilot piston 55.

The smooth rolling of the diaphragm 62 from one vertical surface to an opposed vertical surface during the opening and closing of the pilot valve provides for a balancing of forces on opposite sides of the rolling diaphragm with a smooth transition. Gas pressure forces are thereby capable of effectively transmitting changes in pressure from above to below the rolling diaphragm with minimal interference and an accurate transmission of forces. Accordingly, the rolling diaphragm assists in the smooth overall operation of the pilot controlled blanketing valve of the present invention.

Figure 6:
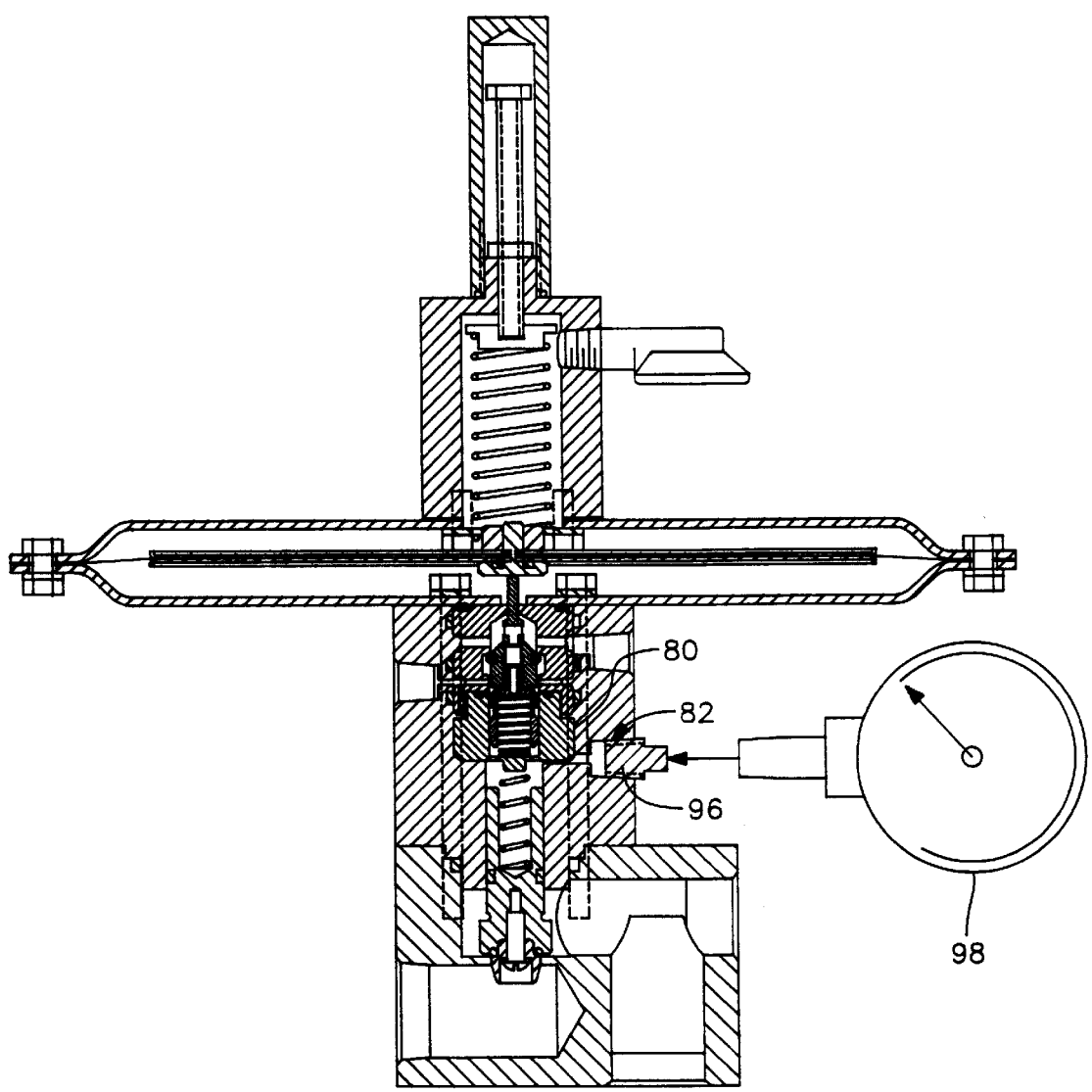
FIG. 6 is a schematic view demonstrating the intended connection of a pressure gauge to a diagnostic port located in a sidewall of the blanketing valve.
Figure 7:
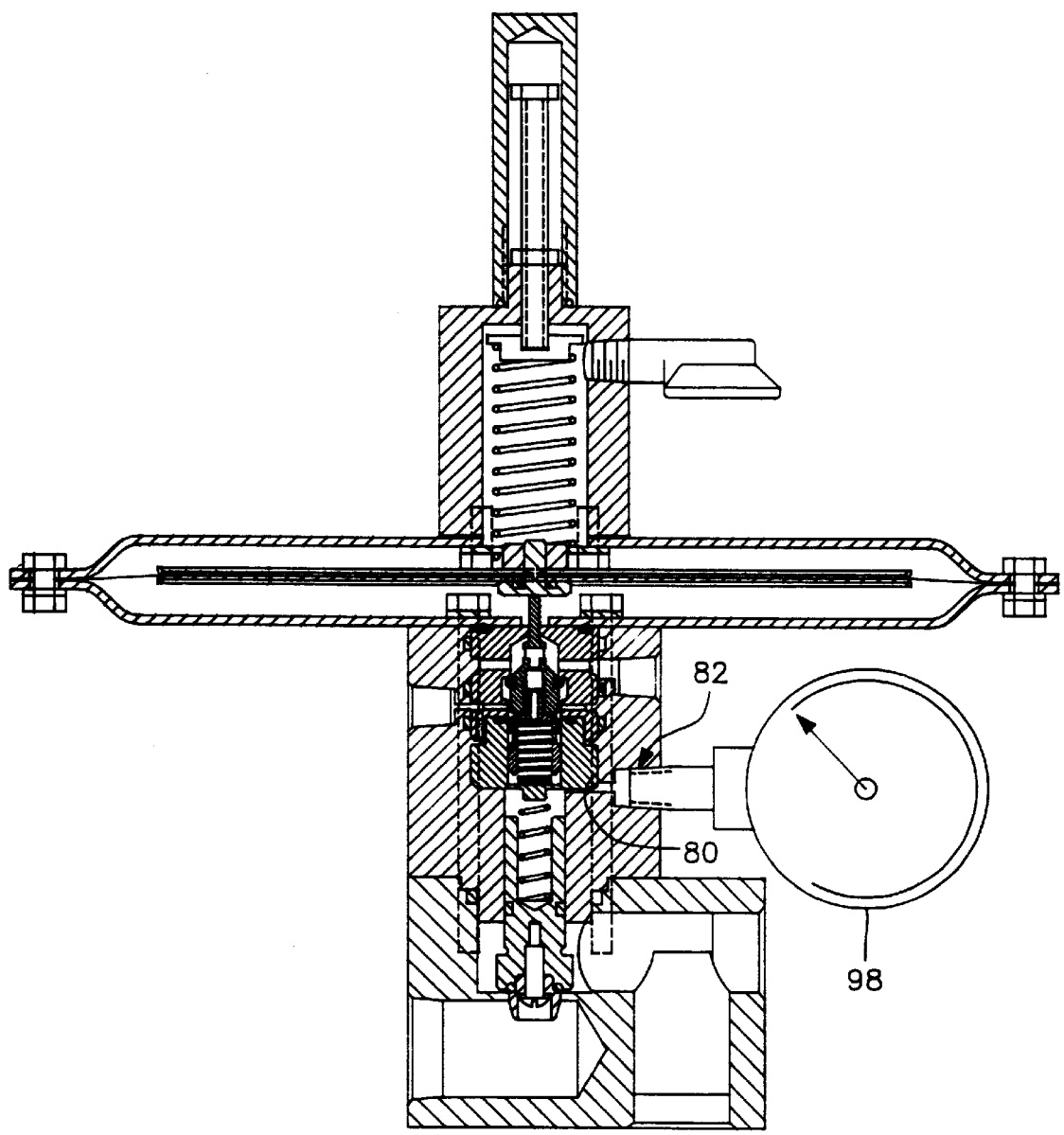
FIG. 7 illustrates the connection of a pressure gauge to the diagnostic port located in the sidewall of the blanketing valve.

In FIGS. 6 and 7, a detailed sectional view of the pilot controlled blanketing valve according to the principles of the present invention is shown. In these Figures, the sensing line 30, shown in FIGS. 2 and 3 has been omitted for clarity. In FIGS. 6 and 7, the diagnostic port 82 is shown, located in a side wall of the housing of the overall assembly. The port is in communication with passageway 80 which is an annular passageway extending between the outer surface of the lower cage 88 of the pilot valve and the interior wall of the bore of the housing within which the pilot valve is mounted.

In FIG. 6, a pipe plug 96 is shown located in the port 82. When the pipe plug 96 is removed as shown in FIG. 7, the pressure gauge 98 will measure the gas pressure in passageway 80 which will provide information as to the operation of the blanketing valve. This information can then be used to determine if the valve is operating correctly.

In FIGS. 6 and 7, a conventional pressure gauge is shown, such as a Bourdon tube style gauge. However, it is envisioned as being within the scope of the present invention to use any instrument capable of measuring and displaying pressure. Some examples are a pressure transducer with display, oscilloscope, or a recorder to name a few. In addition, a remotely controlled measuring device can be used to ascertain correct working of the valve from a remote location with respect to the valve.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A blanketing valve for allowing transfer of gas to a tank having a liquid contained therein, said blanketing valve comprising:

a housing including a pilot valve, a main valve and an actuator, an inlet gas line to said housing for receipt of inlet gas, said inlet gas line being connected to said pilot valve and said main valve, a pilot intake chamber within which said pilot valve is movable, said pilot intake chamber being in communication with a source of inlet gas through said inlet gas line for passage of inlet gas to the tank upon movement of said pilot valve, a piston chamber formed by said housing including a piston of said main valve for controlled movement of said piston upon movement of said pilot valve, a passageway extending between said pilot intake chamber and said piston chamber for transfer of gas between said pilot intake chamber and said piston chamber upon movement of at least one of said pilot valve and said main valve, a diagnostic port in communication with said passageway, and a pressure gauge connected to said diagnostic port, said pressure gauge measuring pressure in said passageway for comparing the measured pressure against a pressure in said inlet gas line to determine if an equilibrium condition is present, if said pilot valve is open, or if both said pilot valve and said main valve are open.

2. A blanketing valve as claimed in claim 1, wherein said port extends between said passageway and an exterior of said housing.

3. A blanketing valve as claimed in claim 1, wherein said actuator moves said pilot valve based upon pressure in the tank.

4. A blanketing valve as claimed in claim 3, wherein said actuator includes a diaphragm in contact with a poppet of said pilot valve with a spring located on an opposite side of said diaphragm from said poppet.

5. A blanketing valve as claimed in claim 1, wherein said pilot valve is located in a chamber in said housing, said chamber being divided by a rolling diaphragm to separate gas in said chamber.

6. A blanketing valve as claimed in claim 5, wherein said rolling diaphragm includes two vertically extending portions separated from each other, said two vertically extending portions changing in length dependent upon movement of said pilot valve.

* * * * *